June 4, 1929.  S. N. HURT  1,715,838
INDICATOR
Filed Aug. 28, 1926
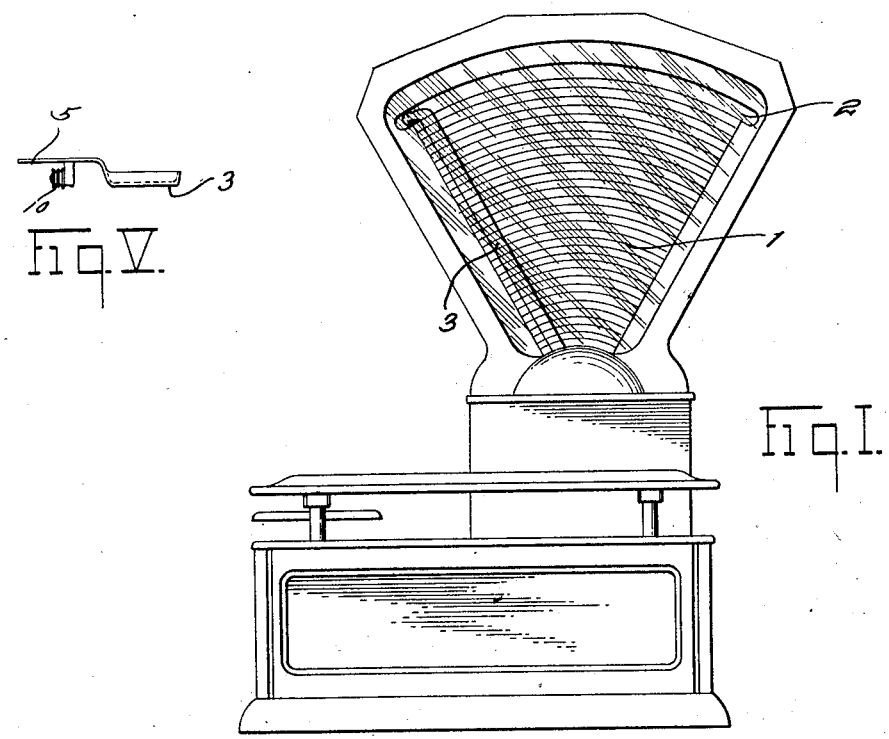
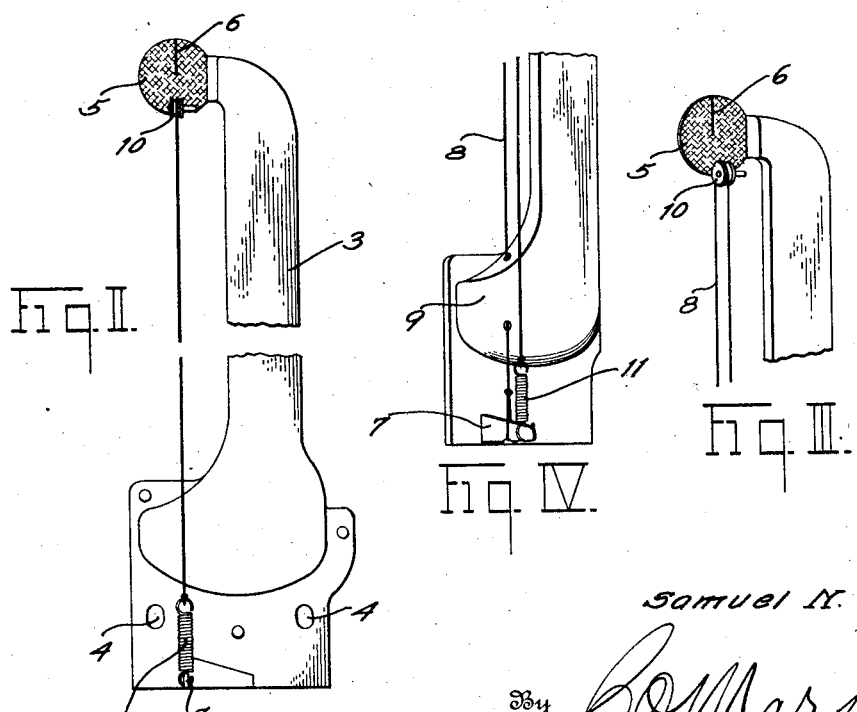
Inventor
Samuel N. Hurt
By C. O. Marshall
Attorney Patented June 4, 1929.

1,715,838

UNITED STATES PATENT OFFICE.

SAMUEL N. HURT, OF TOLEDO, OHIO, ASSIGNOR TO TOLEDO SCALE COMPANY, OF TOLEDO, OHIO, A CORPORATION OF NEW JERSEY.

INDICATOR.

Application filed August 28, 1926. Serial No. 132,143.

This invention relates to weighing scales, and particularly to indicators therefor, and its principal object is the provision of an indicator hand adapted to co-operate with a weighing and computing chart and so constructed that weights and computed values on the chart may be read without errors of parallax.

Another object is the provision of an indicator hand of light but rigid construction.

Another object is the provision of an indicator hand having a reading and sighting line, with means for holding such reading and sighting lines taut.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a weighing scale equipped with an indicating chart and hand made according to my invention;

Figure II is an enlarged elevational view of the indicator hand of my invention removed from the scale, parts being broken out;

Figure III is a view in perspective of the upper end of the hand shown in Figure II;

Figure IV is a similar view of its lower end; and

Figure V is a plan view of the tip of the hand.

Referring to the drawings in detail, the chart 1 of the scale is provided with an arcuate slot 2.

The indicator hand 3 is attached at its lower end by means of screws (not shown) which pass through suitable openings 4 to the load-counterbalancing element (not shown) of the scale. The body of the hand is substantially channel shaped and the hand at its tip is provided with a brightly colored disk 5 which swings in the slot 2 and is, therefore, visible from both sides of the chart. The disk 5 is flush with the chart and is provided on each side with indicating lines 6 adapted to co-operate with suitably numbered graduations on the front and back of the chart to indicate the weight of the load on the platform. The indication of the weight is thus visible both to the operator of the scale and to his customer, and, since the lines 6 and the weight graduations with which the lines 6 co-operate are in the same plane, the scale can be read by both operator and customer without errors of parallax.

At the lower end of the hand is a bracket 7 to which is attached a flexible line 8 which extends upwardly through openings in an embossed portion 9 of the hand, thence over a spool 10, and thence downwardly, its other end being attached to the bracket 7 by means of a retractile coil spring 11. The spool 10 need not be revoluble, as the force of the spring 11 is sufficient to draw the line over the stationary spool and keep its parallel portions in approximately the same condition of tautness.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, an indicator hand body, said body being substantially channel shaped throughout the major portion of its length, a flexible line, means for attaching one end of said flexible line to the lower end of said indicator hand body, a rearwardly offset tip at the upper end of said indicator hand body, means for holding a bight of said line adjacent said tip, and a spring for connecting the other end of said line to the lower end of said hand and holding said line taut with the portions on each side of its bight parallel.

2. In a device of the class described, in combination, a chart, said chart having an arcuate opening therein, an indicator hand adapted to move over the face of said chart, a line, means for attaching one end of said line to the lower end of said indicator hand, a tip at the upper end of said indicator hand adapted to swing in said arcuate slot, means for holding a bight of said line adjacent said tip, and resilient means for attaching the other end of said line to the lower end of said hand.

3. In a device of the class described, in combination, an indicator hand body provided with a substantially circular portion, a flexible line, means for attaching one end of said flexible line to one end of said indicator hand body, an offset tip extending from the circular portion of said hand, means for holding the bight of said line adjacent said tip, and resilient means for connecting the other end of said line to said hand and holding said line taut with the portions on each side of its bight parallel.

4. In a device of the class described, in combination, a chart, said chart having an arcuate slot therein, an indicator hand adapted to swing over the face of said chart, said hand being formed with a substantially circular portion adapted to swing in said slot, a flexible line, and a spool secured to said hand adjacent said circular portion, said line being adapted to pass over said spool and having its ends secured to one end of the hand, the portions of said line on each side of the bight formed by the spool being in parallel relation.

5. In a device of the class described, in combination, a chart having an arcuate slot, an indicator hand adapted to swing over the face of said chart, said hand being formed with a circular portion adapted to swing in the arcuate slot in the plane of said chart, a flexible line, means for securing one end of said line to the indicator hand, means adjacent the circular portion of said hand for holding a bight of said line, and resilient means for securing the other end of said line to the hand whereby the portions of said line on each side of said bight are held taut and in parallel relation.

SAMUEL N. HURT.